US009877026B2

(12) United States Patent
Unno et al.

(10) Patent No.: US 9,877,026 B2
(45) Date of Patent: Jan. 23, 2018

(54) IMAGE TRANSMISSION SYSTEM

(71) Applicant: HITACHI MAXELL, LTD., Osaka (JP)

(72) Inventors: Kyohei Unno, Tokyo (JP); Mitsuhiro Okada, Tokyo (JP); Hironori Komi, Tokyo (JP)

(73) Assignee: Hitachi Maxell, Ltd., Osaka (JP)

( * ) Notice: Subject to any disclaimer, the term of this patent is extended or adjusted under 35 U.S.C. 154(b) by 278 days.

(21) Appl. No.: 14/436,094

(22) PCT Filed: Oct. 15, 2013

(86) PCT No.: PCT/JP2013/077983
§ 371 (c)(1),
(2) Date: Apr. 16, 2015

(87) PCT Pub. No.: WO2014/061664
PCT Pub. Date: Apr. 24, 2014

(65) Prior Publication Data
US 2015/0271497 A1 Sep. 24, 2015

(30) Foreign Application Priority Data
Oct. 17, 2012 (JP) .................. 2012-229431

(51) Int. Cl.
H04N 19/00 (2014.01)
H04N 19/124 (2014.01)
(Continued)

(52) U.S. Cl.
CPC ....... H04N 19/124 (2014.11); G06K 9/00798 (2013.01); H04N 7/183 (2013.01);
(Continued)

(58) Field of Classification Search
CPC .... H04N 19/124; H04N 19/176; H04N 19/46; H04N 19/167; H04N 7/183
See application file for complete search history.

(56) References Cited

U.S. PATENT DOCUMENTS

| 5,559,557 | A  | * | 9/1996  | Kato   | H04N 19/159 |
|-----------|----|---|---------|--------|-------------|
|           |    |   |         |        | 375/240.03  |
| 2010/0303351 | A1 | * | 12/2010 | Umeda  | H04N 1/62   |
|           |    |   |         |        | 382/167     |
| 2013/0010119 | A1 | * | 1/2013  | Mitsugi | B60R 1/00  |
|           |    |   |         |        | 348/148     |

FOREIGN PATENT DOCUMENTS

JP 1-228383 A 9/1989
JP 6-165155 A 6/1994
(Continued)

OTHER PUBLICATIONS

International Search Report of PCT/JP2013/077983.

Primary Examiner — Utpal Shah
(74) Attorney, Agent, or Firm — Mattingly & Malur, PC

(57) ABSTRACT

The image transmission system, which transmits image data from a transmission side and performs image processing at a reception side, is provided with: an image transmission device that encodes an input image and outputs a bitstream; an image reception device that receives and decodes the bitstream and performs image processing; a bit precision information generation unit that generates bit precision information for each region in the image; a quantization control unit that controls the quantization step width in a quantization process performed in the image transmission device in accordance with the bit precision information generated by the bit precision information generation unit; and an image processing unit that performs image processing using the decoded image that has been decoded by the image reception device. The bit precision information gen-
(Continued)

eration unit switches the method for generating bit precision information in accordance with the processing mode of the image processing unit.

10 Claims, 15 Drawing Sheets

(51) Int. Cl.
*G06K 9/00* (2006.01)
*H04N 7/18* (2006.01)
*H04N 19/176* (2014.01)
*H04N 19/46* (2014.01)
*H04N 19/167* (2014.01)

(52) U.S. Cl.
CPC ......... *H04N 19/167* (2014.11); *H04N 19/176* (2014.11); *H04N 19/46* (2014.11); *G06T 2207/30252* (2013.01)

(56) References Cited

FOREIGN PATENT DOCUMENTS

| | | |
|---|---|---|
| JP | 9-200764 A | 7/1997 |
| JP | 10-164572 A | 6/1998 |
| JP | 2003-309832 A | 10/2003 |
| JP | 2005-212709 A | 8/2005 |
| JP | 2005-252556 A | 9/2005 |

* cited by examiner

FIG.4

| $D_{MB}$ | $QP_{off}$ |
|---|---|
| 12 | 0 |
| 11 | 6 |
| 10 | 12 |
| 9 | 18 |
| 8 | 24 |
| 7 | 30 |
| 6 | 36 |

FIG.5

| $D_{MB}$ | $QP_{off}$ |
|---|---|
| 12 | 0 |
| 11 | 2 |
| 10 | 5 |
| 9 | 9 |
| 8 | 14 |
| 7 | 20 |
| 6 | 27 |

FIG.9

| No. | MODE | SPECIFIC PROCESSING EXAMPLE | TYPES OF CORRESPONDING CAMERA | EXAMPLE OF SETTING BIT PRECISION INFORMATION |
|---|---|---|---|---|
| 1 | LANE DETECTION | PERFORM LANE DETECTION, AND SOUND AN ALARM WHEN VEHICLE IS ABOUT TO DEVIATE FROM THE LANE | FRONT AND REAR | FIG. 7 |
| 2 | OVERVIEW | GENERATE AND DISPLAY AN IMAGE, SUCH AS AN IMAGE OF A VEHICLE LOOKED DOWN FROM THE SKY | FRONT, SIDES, AND REAR | FIG. 8 |
| 3 | OBSTACLE DETECTION | PERFORM OBSTACLE DETECTION, AND SOUND AN ALARM WHEN THE VEHICLE IS ABOUT TO COLLIDE WITH AN OBSTACLE | FRONT, SIDES, AND REAR | FIG. 10 |
| 4 | ROAD SIGN DETECTION | DETECT ROAD SIGNS, SUCH AS SPEED LIMIT, AND SOUND AN ALARM WHEN THE VEHICLE IS NOT FOLLOWING ROAD SIGNS | FRONT | FIG. 11 |
| 5 | THROUGH | DISPLAY A DECODED IMAGE AS IT IS | FRONT, SIDES, AND REAR | FIG. 12 |

IMAGE TRANSMISSION SYSTEM

INCORPORATION BY REFERENCE

This application claims the benefit of priority from Japanese Patent Application No. 2012-229431, filed on 17 Oct. 2012, the entire contents of which are incorporated herein by reference.

TECHNICAL FIELD

The present invention relates to image transmission systems.

BACKGROUND ART

In recent years, an image transmission system connected to a network is widely used in a monitoring camera system and the like. Moreover, the applications for the future are being contemplated, such as an application in which a plurality of cameras mounted on an automobile are connected via a digital network and utilized in a driving assistance system.

In the above-described example, in order to improve the visibility in a light and dark portion and improve the recognizability of a fine shape, a high-gradation image whose gradation is expanded from the gradation of a conventional 8-bit precision YUV signal needs to be used.

When such high-gradation image data is transmitted under limited transmission band conditions of a network or the like, for example by sampling and encoding the YUV components of an original image at 12 bits, the gradation expression of the original image will be improved while the amount of encoding will be increased. Therefore, a technique is desired for efficiently reducing the amount of encoding by encoding while maintaining the number of gradations of an original image as much as possible.

JP-A-2005-252556 (Patent Literature 1) is one of the background art documents of the technical field.

CITATION LIST

Patent Literature

PATENT LITERATURE 1: JP-A-2005-252556

SUMMARY OF INVENTION

Technical Problem

Patent Literature 1 describes a technique for efficiently encoding a high-gradation image. In the technique, the characteristic of CT (Computed Tomography) image data is used, and there is described "whether the pixel value for each pixel of the image data is within a predetermined range is determined and then high-precision encoding is performed only on pixels within this range while low-precision encoding is performed on pixels outside this range".

However, which pixel or area within an image is to be encoded with high precision differs with the characteristic of an image to be encoded or with an application in the subsequent stage using the encoded image data.

In this regard, Patent Literature 1 considers neither a case where an image other than the CT image is encoded nor a case where encoded image data is used in applications other than the diagnostic imaging.

The present invention provides an image transmission system capable of solving the above-described problems and efficiently reducing the amount of encoding while maintaining the gradation of a high-gradation image that is an original image, even when the application in the subsequent stage varies.

Solution to Problem

The following explains briefly the outline of a typical invention among the inventions disclosed in the present application. (1) An image transmission system that transmits image data from a transmission side and performs image processing on a reception side, the system including: an image transmission device that encodes an input image and outputs and transmits a bit stream; an image reception device that receives and decodes the bit stream and performs image processing; a bit precision information generation unit configured to generate bit precision information for each region in the image; a quantization control unit configured to control a quantization step width in a quantization process performed in the image transmission device, in accordance with the bit precision information generated by the bit precision information generation unit; and an image processing unit configured to perform image processing using a decoded image decoded by the image reception device, wherein the bit precision information generation unit switches methods for generating bit precision information in accordance with a processing mode of the image processing unit.

Advantageous Effects of Invention

According to the present invention, there is provided an image transmission system capable of efficiently reducing the amount of encoding while maintaining the gradation of a high-gradation image that is an original image, even in the case where an application in the subsequent stage varies.

The other purposes, features, and advantages of the present invention will become clear from the description of the following embodiments of the present invention related to the accompanying drawings.

BRIEF DESCRIPTION OF DRAWINGS

FIG. 4 is a table illustrating a first example of a relationship between the bit precision information and QP offset.

FIG. 5 is a table illustrating a second example of the relationship between the bit precision information and QP offset.

FIG. 9 is a table compiling the types of cameras corresponding to the modes of ADAS.

DESCRIPTION OF EMBODIMENTS

Hereinafter, the embodiments according to the present invention will be described using the accompanying drawings.

First Embodiment

Figure 1:
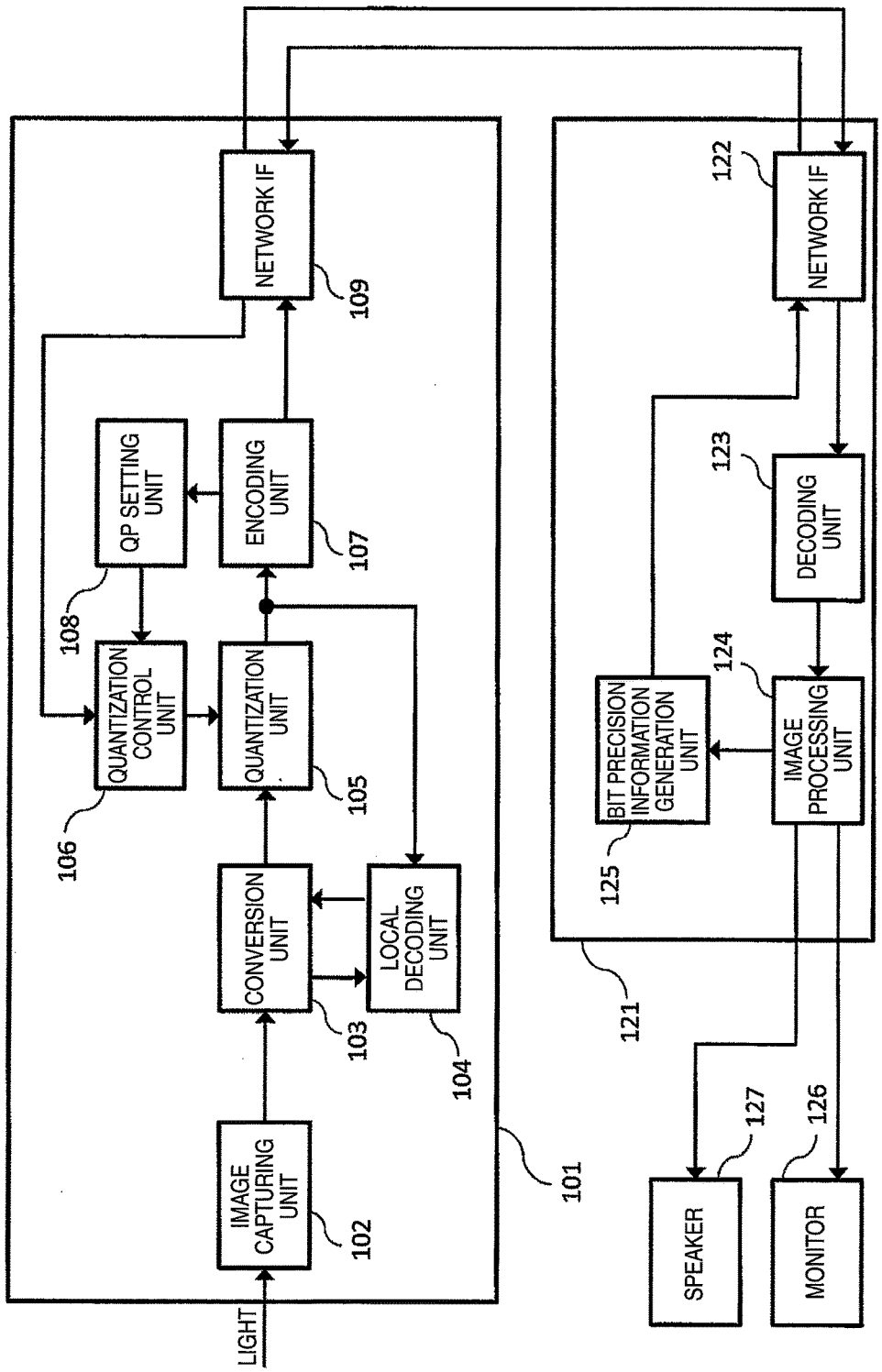
FIG. 1 illustrates a configuration example of a first embodiment of an image transmission system according to the present invention.

FIG. 1 illustrates a configuration example of a first embodiment of an image transmission system according to the present invention. Hereinafter, the present invention applied to an on-board camera system is described as an example.

An image transmission device 101 receives light from the outside, converts the same to an image, encodes the obtained image to generate a bit stream, packetizes or frames the bit stream, and outputs the resulting information to an image reception device 121 via a network IF 109. The image transmission device 101 also receives packetized or framed bit precision information (to be described later) output from the image reception device 121.

An image capturing unit 102 converts the light input from the outside to a high-gradation image and outputs the high-gradation image as an image to be encoded.

Hereinafter, the processing performed by a conversion unit 103, a local decoding unit 104, a quantization unit 105, a quantization control unit 106, an encoding unit 107, and a QP setting unit 108, respectively, is described. This processing is performed for each region (hereinafter, MB) that is obtained by dividing the image to be encoded into 16×16 pixels.

The conversion unit 103 receives the image signal to be encoded, performs the processing (to be described later) on the same, and outputs conversion coefficients.

Figure 2:
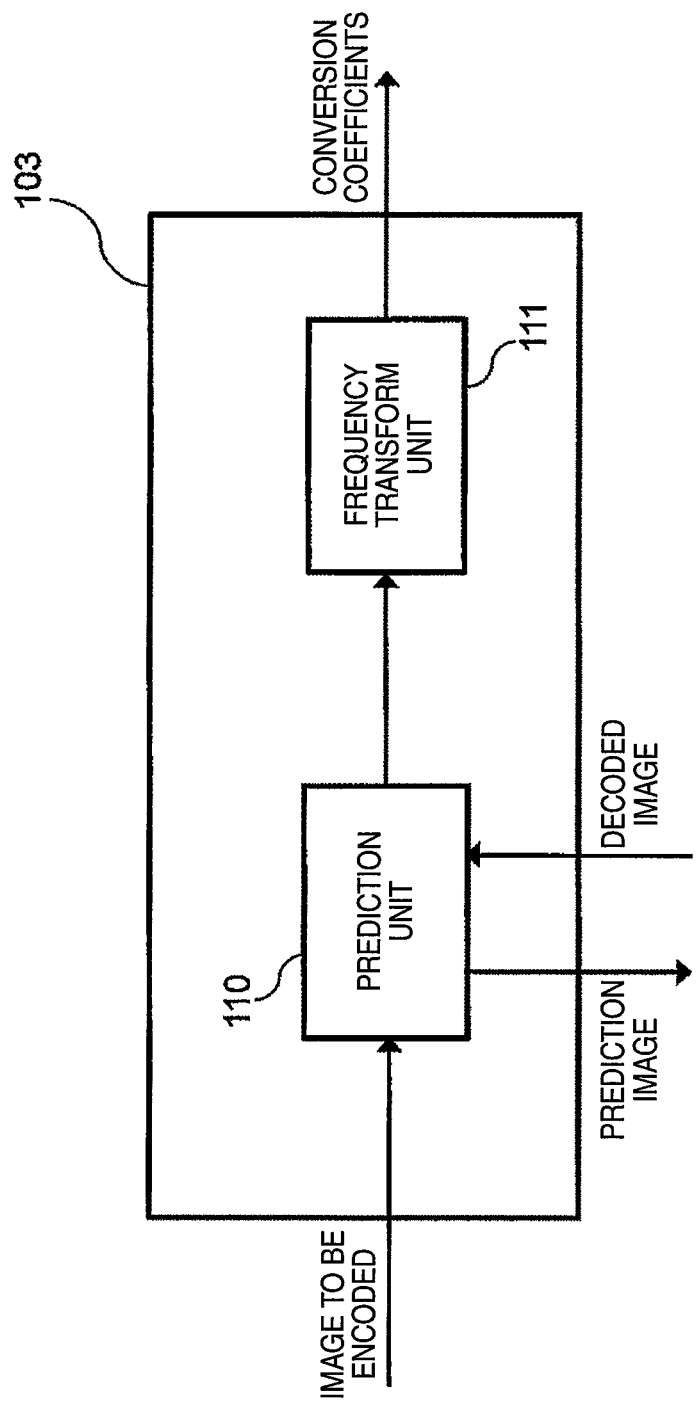
FIG. 2 illustrates a configuration example of a conversion unit in an image transmission device.

An example of the internal configuration of the conversion unit 103 is illustrated in FIG. 2. A prediction unit 110 receives an image to be encoded and a decoded image of an encoded region output from the local decoding unit 104, and prepares, from the decoded image, a prediction image of the image to be encoded, and furthermore generates a residual image by calculating a difference between the prediction image and the image to be encoded and outputs the same to a frequency transform unit 111.

The frequency transform unit 111 performs frequency transform, such as discrete cosine transform (DCT), on the residual image and outputs the resulting transform coefficients.

Note that, here the configuration in which there is the prediction unit 11 has been described as an example of the internal configuration of the conversion unit 103, but a configuration may be employed in which an image to be encoded is directly converted by the frequency transform unit 111 without performing prediction as with ITU-T Rec. T. 81: ISO/IEC 10918-1 (JPEG).

The quantization unit 105 receives the frequency transform coefficients output from the conversion unit 103, quantizes the transform coefficients, and outputs the quantized samples. The quantization step width is controlled using a quantization parameter (QP) as in the encoding scheme, such as ITU-T Rec. H.264: ISO/IEC 14496-10 Advanced Video Coding (hereinafter, H.264). The QP used in the quantization unit 105 is referred to as the encoded QP, and the encoded QP is output from the quantization control unit 106.

The encoding unit 107 receives the quantized samples output from the quantization unit 105, performs entropy encoding on the same, and outputs a bit stream.

The local decoding unit 104 receives the quantized sample output from the quantization unit 105, performs inverse quantization and inverse frequency transform on the same to obtain a residual image including a quantization error, and then sums the residual image and the prediction image output from the prediction unit 110 inside the conversion unit 103 to generate a decoded image, and outputs the decoded image to the prediction unit 110.

The QP setting unit 108 sets a QP for each frame using the amount of encoding of an encoded MB output from the encoding unit 107, and outputs the QP to the quantization control unit 106. Specifically, for example, in order to realize the encoding at a target bit rate, a target amount of encoding preset for each frame and an actual amount of encoding are compared for feedback control so as to increase or decrease the QP value of the frame in a direction approximating the target amount of encoding. Note that, hereinafter the QP output from the QP setting unit will be referred to as a base QP.

Here, a case has been described, where the base QP is determined for each frame, but the base QP may be set for each MB or for each plurality of MBs. Furthermore, a fixed base QP may be used throughout the whole sequence.

The quantization control unit 106 receives the bit precision information output from the network IF 109, and calculates a QP offset using the same. Subsequently, the quantization control unit 106 sums the base QP input from the QP setting unit 108 and the QP offset and outputs the resulting encoded QP to the quantization unit 105. Here, the bit precision information is the information indicative of the number of gradations needed in each region inside an image in the image processing performed by the image processing unit 124 inside the image reception device 121.

The network IF 109 receives the bit stream output from the encoding unit 107, and packetizes or frames the same, and then outputs the packetized or framed bit stream. The network IF 109 also receives packetized or framed bit precision information via a network from the image reception device 121, de-packetizes or de-frames the same, and outputs the resulting information to the quantization control unit 106.

The bit precision information of one screen is received at the beginning of each frame of the image to be encoded, and is written into a RAM inside the quantization control unit 106. The bit precision information written to the RAM is read and used in calculating the QP offset in each MB.

The setting of the bit precision information can be changed for each frame in this manner, but does not always have to be changed for each frame. If any bit precision information is not transmitted at the beginning of a frame, the bit precision information used in the last frame is inherited and used as it is.

Next, an example of a specific control method using the bit precision information is described.

If the bit precision (number of gradations) of each of the YUV components of an input image is denoted by $D_{in}$, then bit precision information $D_{MB}$ in each MB is expressed by $1 \leq D_{MB} \leq D_{in}$ where $D_{MB}$ is an integer. For example, when the bit precision of an input image is 12 bits ($D_{in}=12$), $D_{MB}$ takes either one of the integer values from 1 to 12.

First, the base QP is determined in the QP setting unit 108.

Next, bit precision information of one screen received via the network IF 109 from the image reception device 121, the bit precision information of the relevant MB is read.

Figure 3:
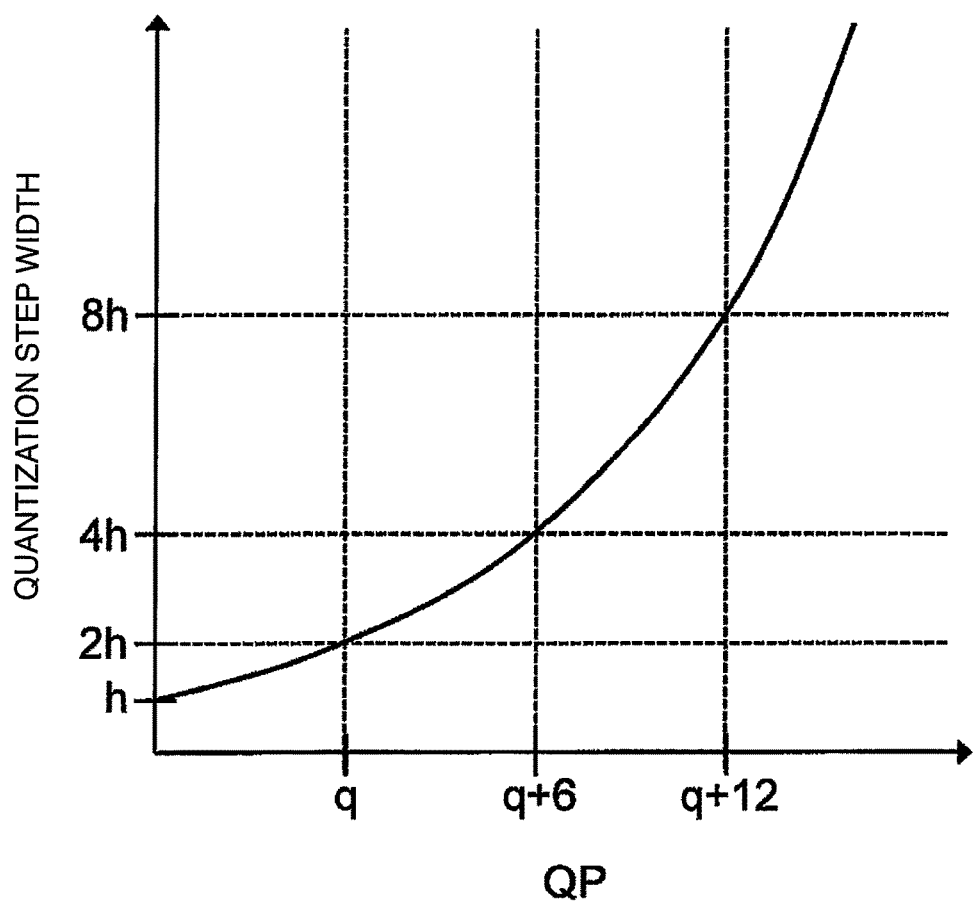
FIG. 3 is a graph illustrating a relationship between the QP and quantization step width in H.264.

Based on the bit precision information of the relevant MB, a QP offset $QP_{off}$ is calculated in the quantization control unit 106 using Formula (1).

$$QP_{off}=(D_{in}-D_{MB})\times\alpha \qquad (1)$$

Where $\alpha$ is a real number. In H.264, the quantization step width doubles every time a QP increases by six as illustrated in FIG. 3, which corresponds to a reduction by one bit in the bit precision. Accordingly, when a QP similar to the QP in H.264 is used, the QP offset corresponding to bit precision information can be easily calculated by setting as $\alpha=6$ in Formula (1).

FIG. 4 illustrates a relationship between $QP_{off}$ and $D_{MB}$ when $D_{in}=12$ and $\alpha=6$. Note that, although FIG. 4 illustrates a case of $D_{MB} \geq 6$, QPoff in a case of $D_{MB}<6$ can be obtained using a method similar to the case of $D_{MB} \geq 6$.

In the above, the case of $\alpha=6$ has been described as an example, but if $\alpha$ is determined in advance, the QP offset can be easily calculated with a procedure similar to the above procedure even if $\alpha \neq 6$. Moreover, the QP offset may be determined using a method including the steps of: preparing a table defining a relationship between $D_{in}$, $D_{MB}$, and $QP_{off}$ in advance as illustrated in FIG. 5; and referring to the table every time a $D_{MB}$ is input, instead of using a formula like Formula (1).

Moreover, when the bit precision information of all MBs of one screen are set to the same value, an image to be encoded can be encoded as an image having a bit precision equal to the bit precision information.

For example, when the bit precision $D_{in}$ of an image to be encoded is $D_{in}=12$ and the bit precision information $D_{MB}$ for each MB is $D_{MB}=8$ in all the MBs in a screen, only 8 significant bits among all 12 bits of an image signal to be encoded are used in the image transmission device 101. Moreover, when there is a variable for specifying the bit precision of an image to be encoded, the variable corresponding to the bit_depth_luma or bit_depth_chroma in H.264, the variables is also set to the value equal to the $D_{MB}$ of the whole screen, e.g., 8 bits, and this information is incorporated into a bit stream and transmitted to the image reception device 121.

The number of bits used for calculation is reduced in accordance with the bit precision information as described above and the clock of an unused calculation unit is stopped, so that the power consumption needed for calculation can be reduced.

Next, the configuration and processing of the image reception device 121 in FIG. 1 are described.

The image reception device 121 receives a packetized or framed bit stream from the image transmission device 101, decodes the same, performs image processing, such as recognition processing, using a decoded image, and outputs an image and/or sound to a monitor and/or speaker. The image reception device 121 also generates bit precision information, packetizes or frames the same, and outputs the resulting information to the image transmission device 101.

The network IF 122 receives the packetized or framed bit stream output from the image transmission device 101, de-packetizes or de-frames the same, and outputs the resulting information to the decoding unit 123. The network IF 122 also receives the bit precision information output from the bit precision information generation unit 125, packetizes or frames the same, and outputs the packetized or framed information to the image transmission device 101.

The decoding unit 123 receives the de-packetized or de-framed bit stream, generates a decoded image using the same, and outputs the decoded image to the image processing unit 124.

The image processing unit 124 receives the decoded image, performs the image recognition processing for realizing an advanced driving assistance system (hereinafter, ADAS), e.g., lane detection processing or obstacle detection processing, on the decoded image, and outputs a recognized image to a monitor 126. The image processing unit 124 also outputs an audio signal to a speaker 127 in sounding a lane deviation alarm or the like. The processing types (hereinafter, processing modes) in ADAS, such as the lane detection, the obstacle detection, and the overview monitor, are switchable during driving.

The switching of the processing modes can be realized as follows. For example, when a shift lever interlocked with the processing mode selects a reverse range, the overview monitor mode is automatically selected, while when the interlocked shift lever selects a forward-driving range, such as a drive range or a second range, the lane detection mode is automatically selected.

Moreover, also other than the method for interlocking the processing modes with the shift lever as described above, the processing modes may be switched by a driver or a fellow passenger that explicitly specifies a processing mode, for example, by operating a physical key or touch panel provided in a car-navigation system or the like.

Processing mode information indicative of which processing mode is currently being executed in the image processing unit 124 is output to the bit precision information generation unit 125.

The bit precision information generation unit 125 receives the processing mode information from the image processing unit 124 to switch the method for setting the bit precision information of each MB in a screen in accordance with the processing mode information. The set bit precision information is output to the network IF 122.

Figure 14:
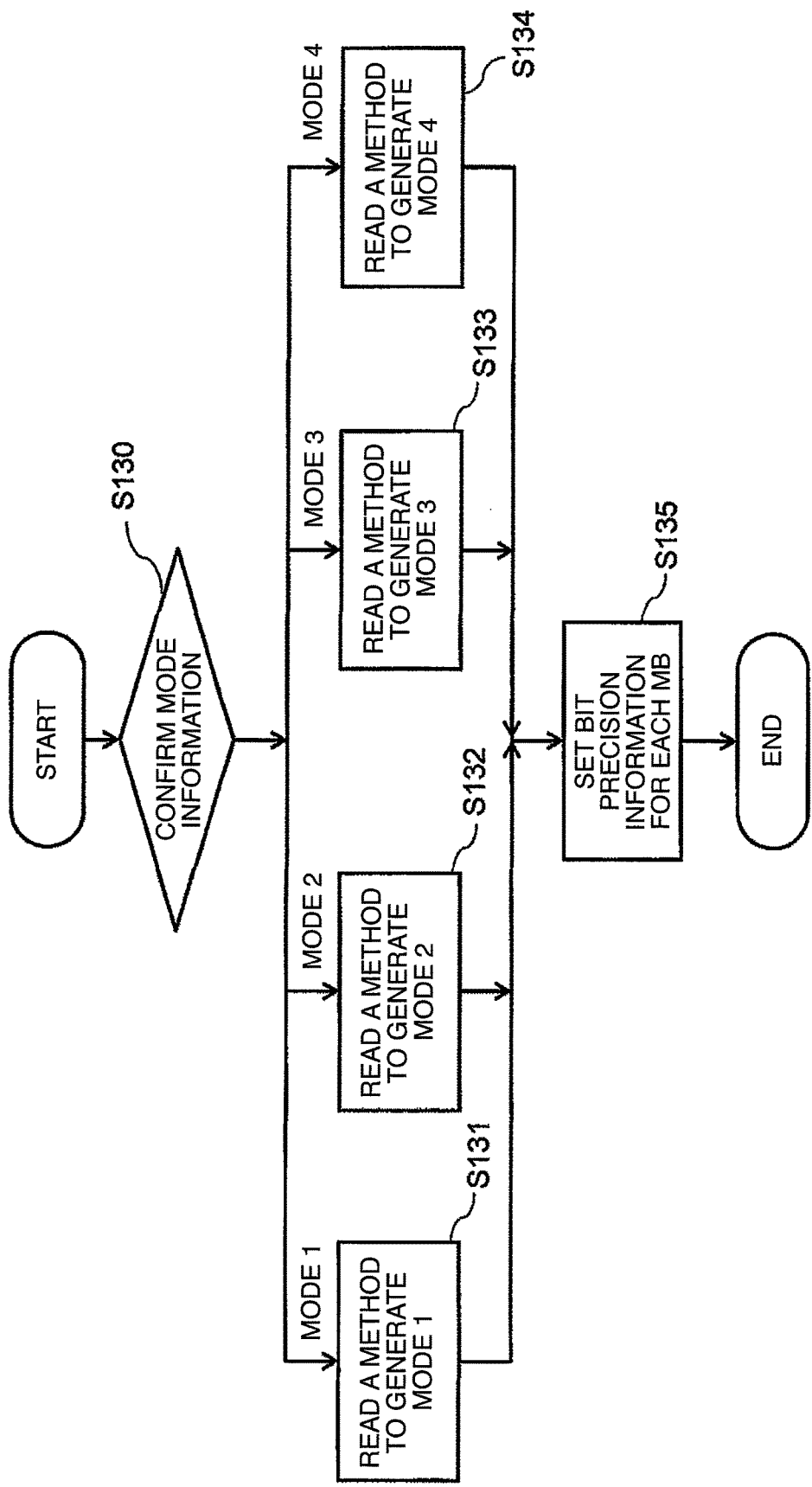
FIG. 14 is a flow chart for setting a method for generating bit precision information.

Here, a case where there are a total of four types of processing modes; mode 1, mode 2, mode 3, and mode 4, is taken as an example and a procedure of switching the methods to generate bit precision information is described using FIG. 14.

First, in step S130, the processing mode information is confirmed for each frame. Next, when the processing mode information is the mode 1, the flow proceeds to step S131, when it is the mode 2, the flow proceeds to step S132, when it is the mode 3, the flow proceeds to step S133, and when it is the mode 4, the flow proceeds to step S134, respectively In step S131, step S132, step S133, and step S134, respectively, a generation method for each mode stored in advance in a memory inside the bit precision information generation unit 125 in read. Subsequently, the flow proceeds to step S135.

In step S135, the bit precision information in each MB inside a screen is generated in accordance with the generation method that is read in either one of step S131, step S132, step S133, and step S134.

Next, in a case where the processing mode information is the lane detection mode and in a case where it is the overview monitor mode for displaying an image, such as an image of a vehicle looked down from the sky, respectively, an example of a specific method for generating bit precision information is described. Moreover, there are usually three types of on-board cameras; a front camera installed on a vehicle front portion; a side camera installed on a vehicle side; and a rear camera installed at a vehicle rear portion, but here a case where the front camera is used is described as an example.

Figure 6:
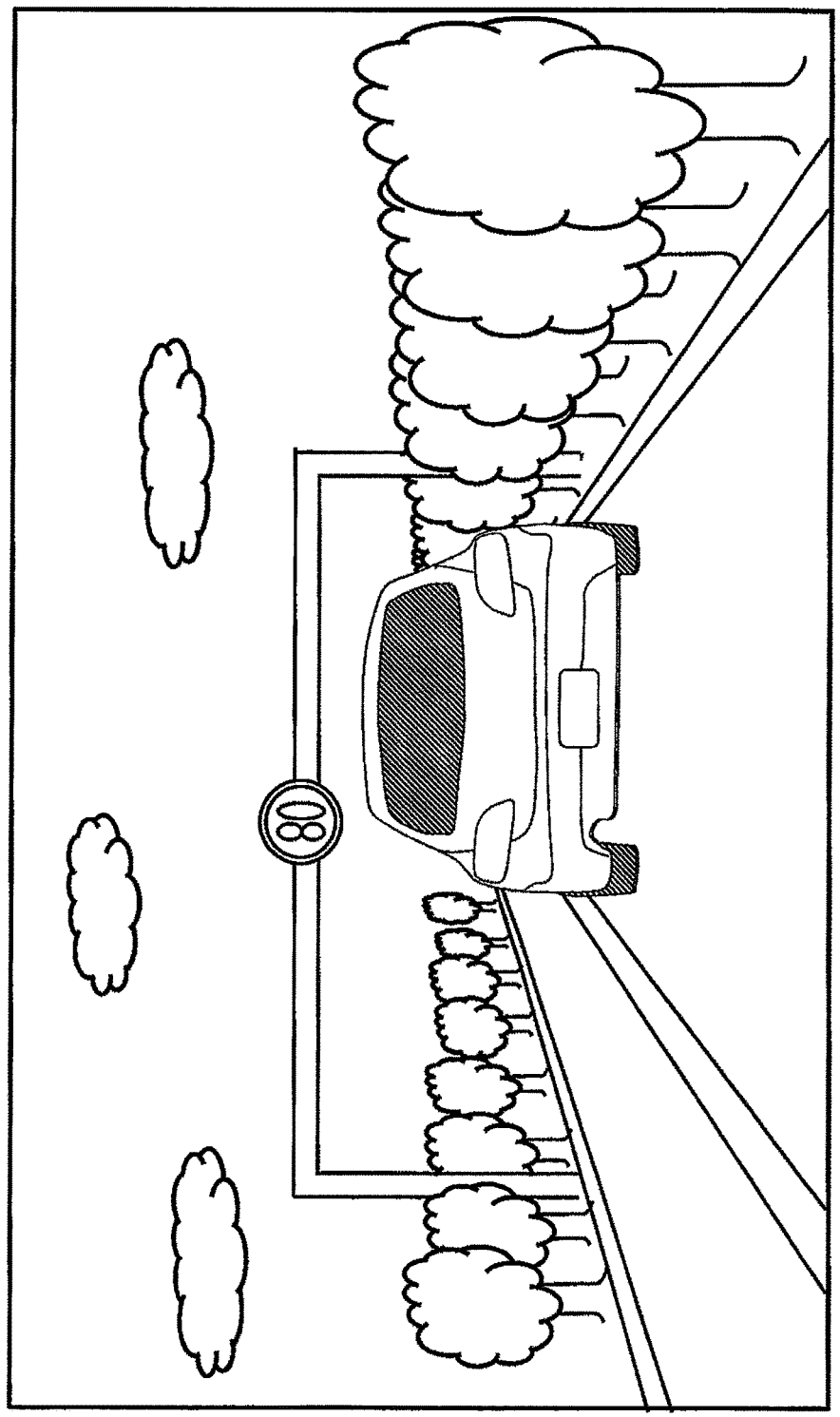
FIG. 6 illustrates an example of an image shot by an on-board camera.

First, a case where the processing mode information is the lane detection mode is described. For example, when an image as in FIG. 6 has been obtained with the front camera, only the road portion in the lower half of the screen is important for lane detection. Then, when the front camera is being used in the same mode, there is basically no change in angle of the camera and a region occupied by the road portion in the whole screen is also substantially constant.

Accordingly, if the bit precision information is set so that only the lower half of the screen has a higher bit-precision and the upper half of the screen has a lower bit-precision, the amount of encoding can be efficiently reduced while maintaining the number of gradations of the portion important for lane detection processing. Note that, for convenience of description, the expressions "the upper half of the screen and the lower half of the screen" are used here, but the screen does not need to be necessarily divided into perfectly two equal parts, and the screen may be divided so that the region occupied by a road portion in the whole screen is distinguished from the other regions.

Figure 7:
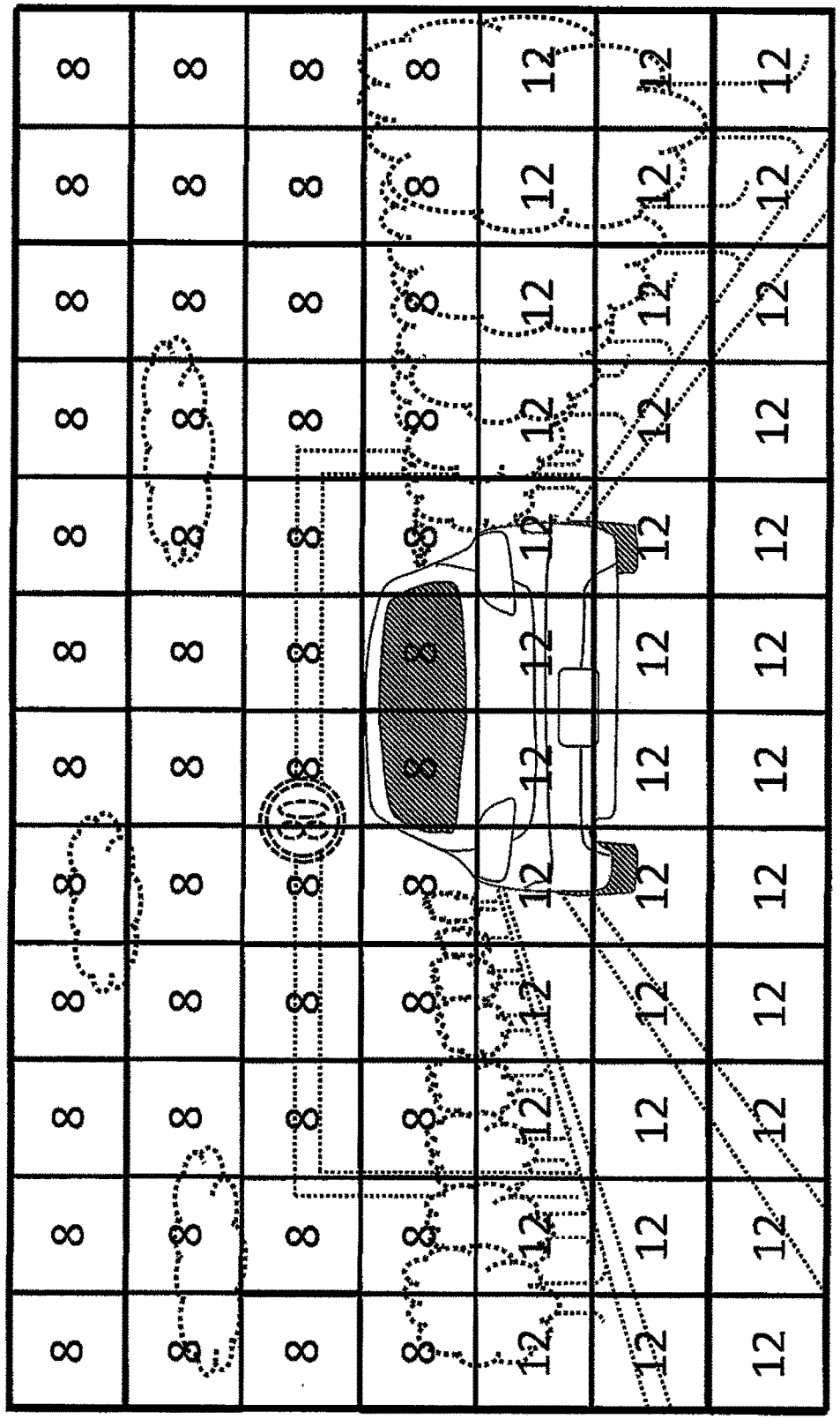
FIG. 7 illustrates an example of setting the bit precision information in a lane detection mode.

FIG. 7 illustrates an example in a case where the bit precision information is set so that the upper half of the screen has a lower bit-precision and the lower half of the screen has a higher bit-precision.

In FIG. 7, the straight lines drawn in parallel at a predetermined interval in the horizontal and vertical directions represent the border lines between MBs, and the number displayed inside each MB represents the bit precision information $D_{MB}$ of each MB.

In the example of FIG. 7, the bit precision of the MBs subjected to the image recognition processing in the lane detection processing is set to 12 bits precision, while the bit precision of the other MBs is set to 8 bits precision widely used in a display device, assuming a case where an image is displayed on the monitor 126.

Figure 15:
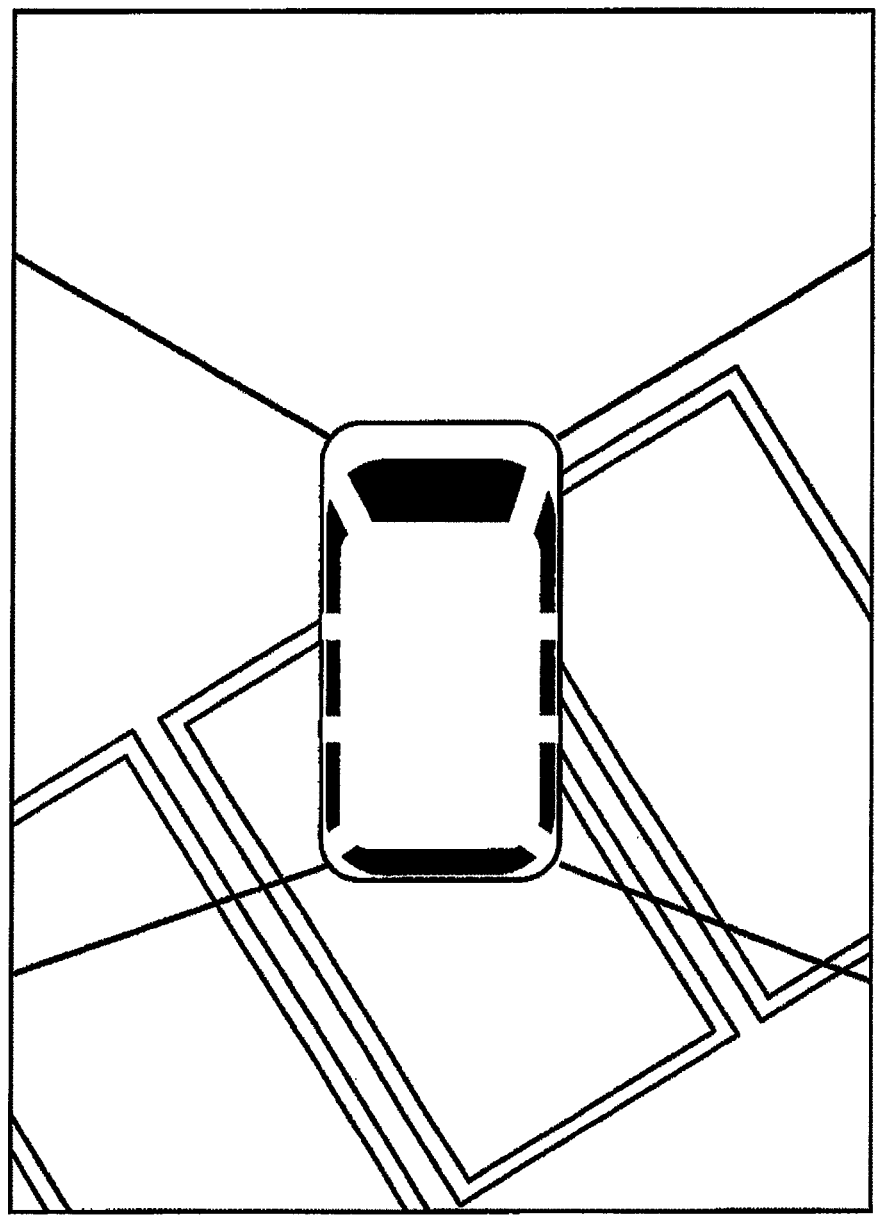
FIG. 15 illustrates an example of the image displayed on a monitor in an overview monitor mode.

Next, a case where the processing mode information switches to the overview monitor mode is described. The overview monitor mode is the mode, in which images shot with a total of four cameras; the front camera; the right and left side cameras; and the rear camera, are converted and combined and an image, such as an image of the vehicle looked down from the sky as in FIG. 15, is displayed on the monitor.

Figure 8:
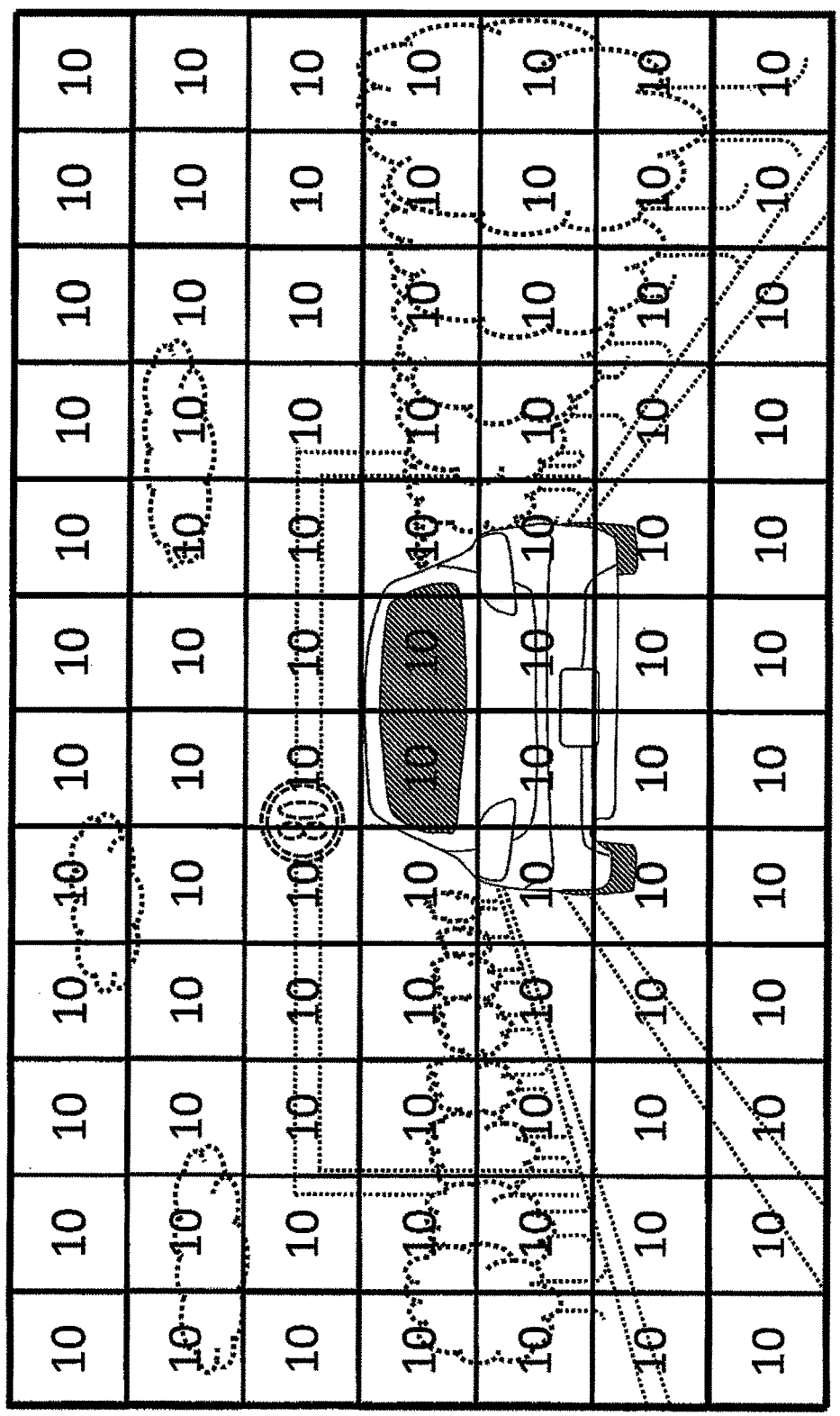
FIG. 8 illustrates an example of setting the bit precision information in an overview monitor mode.
Figure 16:
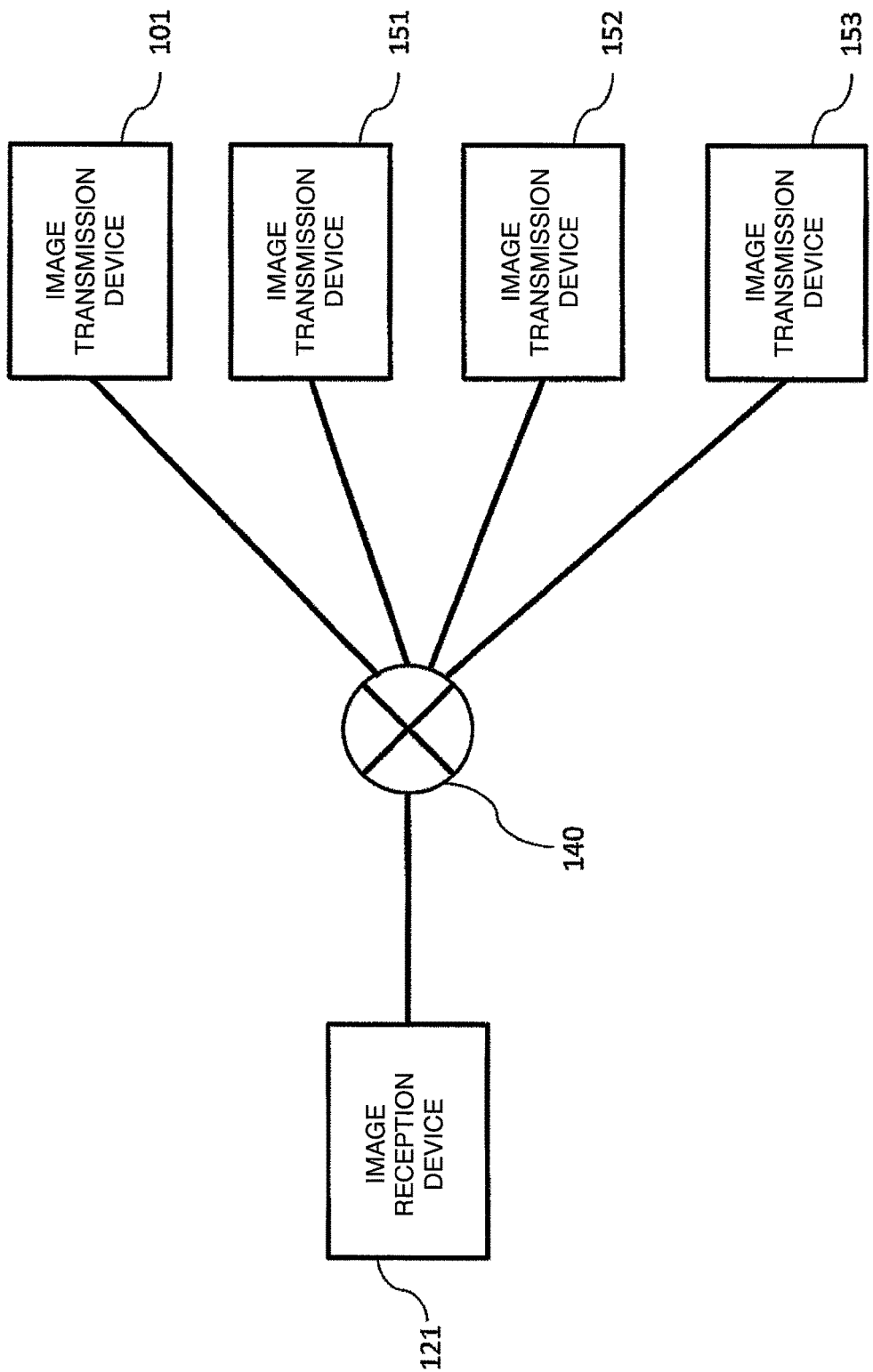
FIG. 16 illustrates an example of the block diagram for realizing the overview monitor mode.

In the overview monitor mode, image recognition processing is not particularly performed inside the image-processing-unit 124, but in order to connect four image transmission devices 101, 151, 152, and 153 corresponding to the front camera, the right and left side cameras, and the rear camera, respectively, to the image reception device 121 via a network 140 as illustrated in FIG. 16 to transfer image data at the same time, the amount of encoding of each image data needs to be reduced taking into consideration the transmission band. Accordingly, in the case of the overview monitor mode, both a reduction of the amount of encoding and the calculation accuracy in performing the image conversion processing are taken into consideration, and the bit precision information $D_{MB}$ is set to ten, for example, for all the MBs inside the screen as illustrated in FIG. 8.

As described above, setting patterns of the bit precision information with respect to the respective modes are recorded in advance into a memory inside the bit precision information generation unit and an appropriate setting pattern is read in accordance with the processing mode information. Therefore, it is possible to maintain the number of gradations of a portion used for the recognition processing in each processing of ADAS and at the same time to efficiently encode the other portions by reducing the amount of encoding of the other portions.

Moreover, in the configuration, the image reception device 121 includes both the image processing unit 124 and the bit precision information generation unit 125. Therefore, for example, in a case of the lane detection mode, the bit precision information may be set using, for example, a method including the steps of: classifying an image inside the screen into the image of a road portion and an image of portions other than the road by the image recognition processing in the image processing unit 124; and inputting the classified results to the bit precision information generation unit 125 so as to assign a higher bit-precision only to the image of the road portion.

Then, instead of using the image recognition result as it is, which region becomes the road portion in a frame to be encoded next is predicted based on the last several frames of recognition results, so that bit precision information may be assigned based on the prediction result.

In this case, a higher bit-precision may be more properly assigned to the road portion that is important for recognition processing, as compared with the method for recording the setting patterns in a memory in advance, and therefore both the recognition accuracy and the encoding efficiency can be improved.

Figure 10:
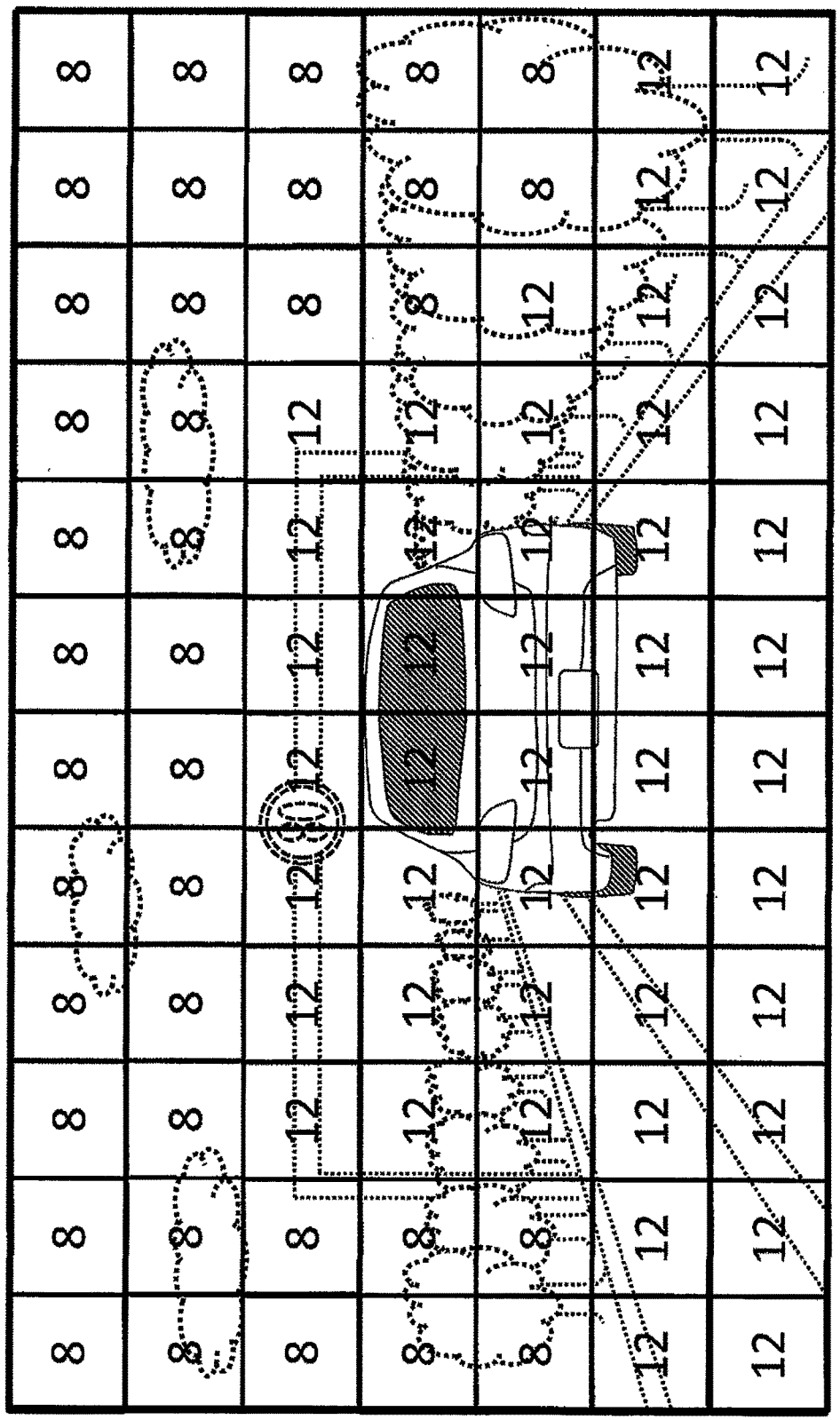
FIG. 10 illustrates an example of setting the bit precision information in an obstacle detection mode.
Figure 11:
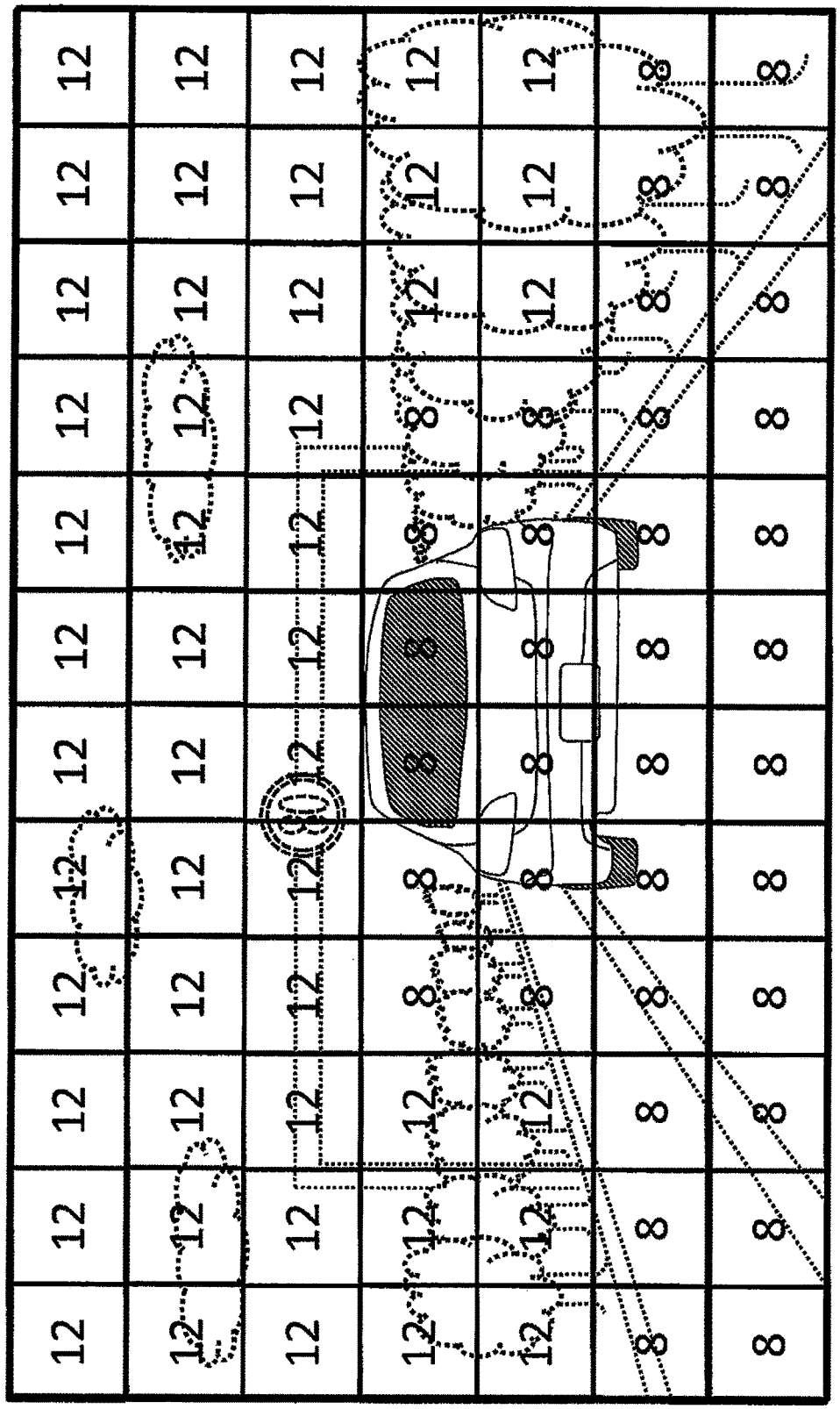
FIG. 11 illustrates an example of setting the bit precision information in a road sign detection mode.
Figure 12:
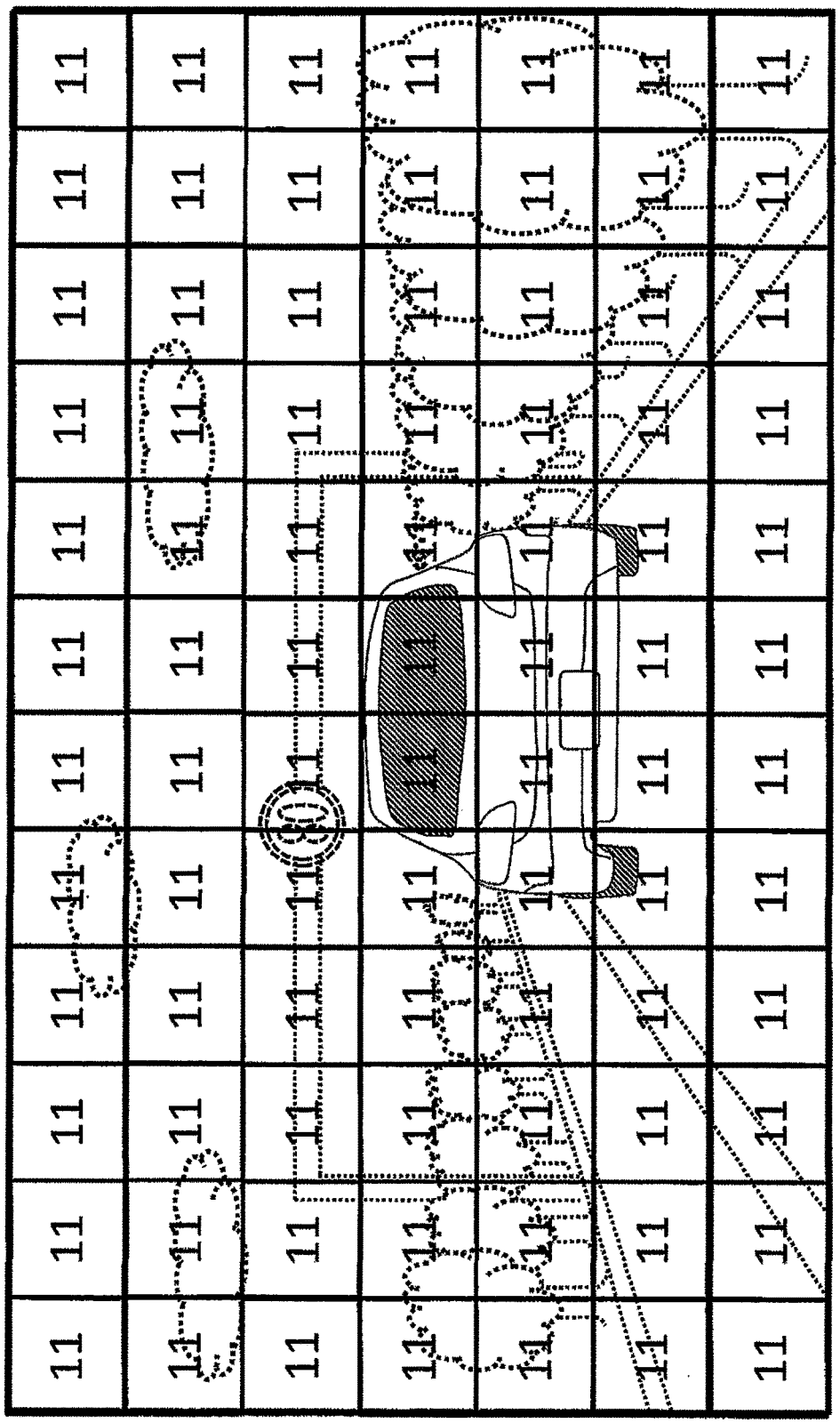
FIG. 12 illustrates an example of setting the bit precision information in a through mode.

In the above, a method for generating bit precision information has been described in the front camera with regard to the lane detection mode and the overview monitor mode, but there are other combinations of the types of on-board camera and the modes of ADAS. FIG. 9 illustrates the other examples of the types of on-board camera and the processing mode information used in switching the bit precision information generation methods. FIG. 10, FIG. 11, and FIG. 12 illustrate the examples of setting the bit precision information in the obstacle detection mode, the road sign detection mode, and the through mode in FIG. 9, respectively. As illustrated in the respective drawings, for example in the case of the obstacle detection mode, for example as illustrated in FIG. 10 higher bit precision information is assigned to an area that may become an obstacle for the vehicle, i.e., to the road portion inside the screen, the periphery thereof, and the portion above the vehicle. In the case of the road sign detection mode, as illustrated in FIG. 11 higher bit precision information is assigned to the upper region where any road sign appears inside the screen, and in the case of through mode, as illustrated in FIG. 12 the decoded image is displayed as it is, instead of setting bit precision information different for each region inside the screen. Note that the example of setting the bit precision information in each mode is not limited to the above-described one but may be variously changed and there may be other mode settings.

Note that, in the above, a case has been described, where the processing mode information output from the image processing unit 124 is obtained to switch the bit precision generation methods in the bit precision information generation unit 125. However, the image reception device 121 may include a CPU that controls the image processing unit 124 and the processing mode of the bit precision information generation unit 125.

As described above, the types of processing performed inside the image processing unit 124 is limited by limiting the application destination of the camera system to an on-board camera system, and therefore the setting patterns of bit precision information stored in the bit precision information generation unit 125 is also limited and thus the memories for storing the setting patterns can be reduced.

Furthermore, by limiting the processing mode information to the information for switching between two types of modes, i.e., the lane detection mode and the overview monitor mode, the memories for storing the setting patterns of the bit precision information can be further reduced. Moreover, when there are only two types of modes, the mode used when next switching occurs is uniquely determined in accordance with a currently used mode and the address on a memory having a setting pattern stored therein can be also identified and therefore the setting pattern can be read at high speed when the mode is switched.

Note that, in the above, the size of an MB has been described as 16×16 pixels, but the size of an MB may be other than 16×16 pixels, for example such as 8×8 pixels or 32×32 pixels. Moreover, the shape of an MB is not limited to the square, but other polygons, such as rectangular, may be used. The minimum size of an MB is one pixel.

In the above, the embodiment of the present invention has been described with an on-board camera system as an example, but the embodiment of the present invention is applicable also to a monitoring camera system with a configuration using the similar image transmission device 101 and image reception device 121. In the case of the monitoring camera, for example a control may be performed for detecting a moving area of a person or the like inside the screen by image recognition processing and for dynamically assigning a higher bit-precision only to the moving area and a lower bit-precision to the other background portions, but not limited thereto. For example, a higher bit-precision may be assigned to a region, such as a passage, where a person or the like may move, inside the screen, while a lower bit-precision may be assigned to regions, such as the upper portion of a wall, and thus the embodiment of the present invention may be variously modified.

Second Embodiment

Figure 13:
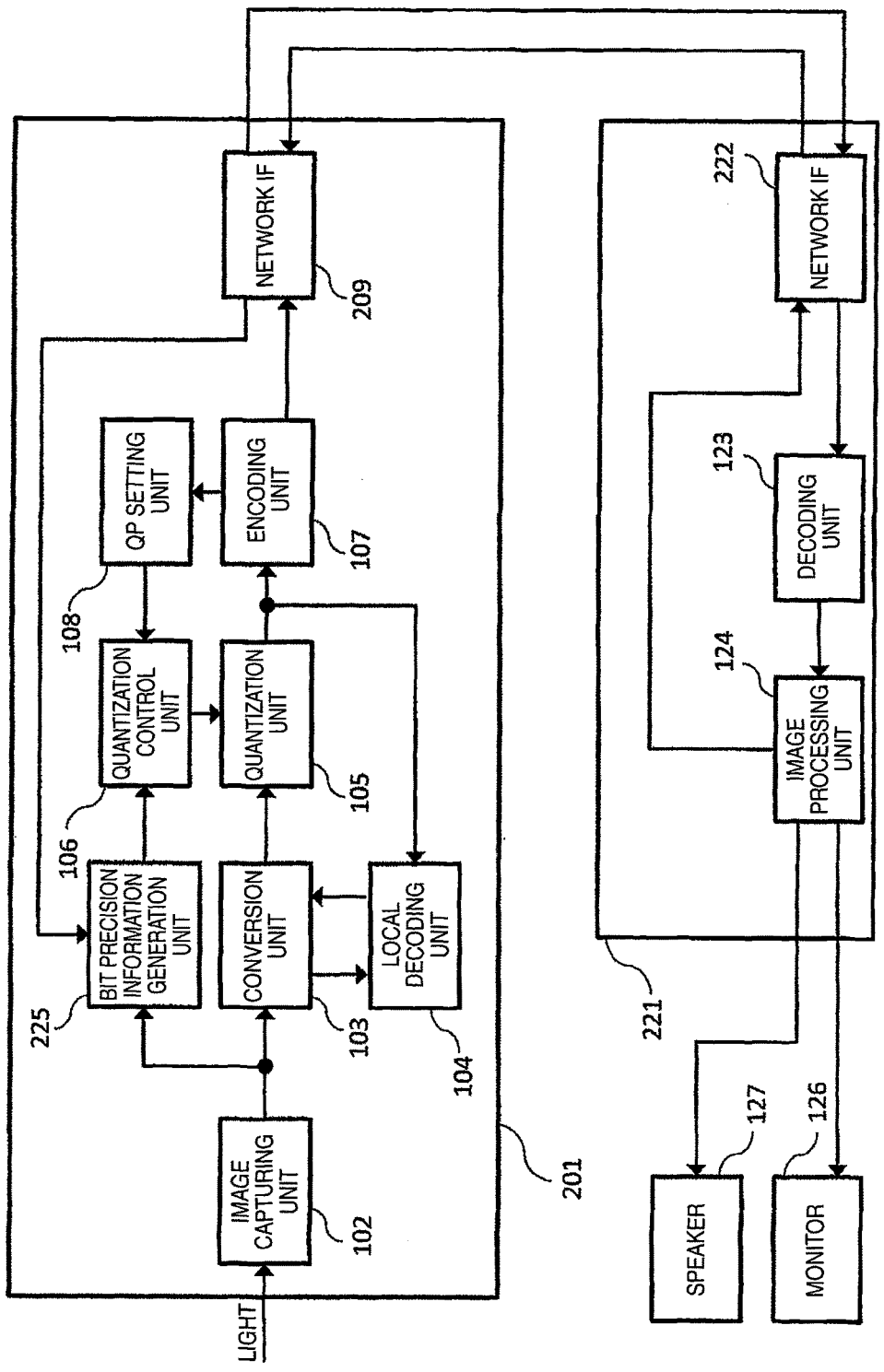
FIG. 13 illustrates a configuration example of a second embodiment of the image transmission system according to the present invention.

FIG. 13 illustrates a configuration example of a second embodiment of the image transmission system according to the present invention. Note that, the configuration illustrated in FIG. 13 is basically the same as the configuration illustrated in FIG. 1 except that a bit precision information generation unit 225 is inside the image transmission device 201, not inside the image reception device 221, and that the processing mode information output from the image processing unit 124 is input to the bit precision information generation unit 225 via a network IF 222 and a network IF 209.

Here, a unit configured to perform the same operation as the unit described in the first embodiment in FIG. 1 is given the same reference symbol and the description thereof is omitted as needed.

The network IF 222 receives a packetized or framed bit stream from the image transmission device 201, de-packetizes or de-frames the same, and outputs the resulting stream to the decoding unit 123 as in the first embodiment, but receives the processing mode information of ADAS output from the image processing unit 124 instead of receiving the bit precision information, packetizes or frames the same, and transmits the resulting information to the image transmission device 201.

The network IF 209 packetizes or frames the bit stream and outputs the resulting stream to the image transmission device 221 as in the first embodiment, but receives the packetized or framed processing mode information instead of receiving the bit precision information, de-packetizes or de-frames the same, and outputs the resulting information to the bit precision information generation unit 225.

The bit precision information generation unit 225 receives the processing mode information output from the network IF 209, sets the bit precision information of each MB inside the screen, and outputs the bit precision information of each MB to the quantization control unit 106.

Here, the bit precision information generation unit 225 may generate the bit precision information using an method similar to the first embodiment.

In the second embodiment, furthermore an image to be encoded may be input to the bit precision information generation unit 225 from the image capturing unit 102, so that the bit precision information corresponding to the image to be encoded may be set.

For example, when a vehicle is running inside a tunnel or on a road under light at night, an image shot with an on-board camera includes a mixture of a bright region and a dark region. Here, in converting light to an image signal, the image capturing unit 102 adjusts the gain in converting light to the image signal in accordance with the intensity of input light for each frame. When there is a mixture of a bright region and a dark region inside one frame as described above, the gain is adjusted in accordance with the bright region and therefore in the dark region the difference between the pixel value of an object or a person and the pixel value of the background portion decreases. When the image processing unit 124 performs image recognition processing, for example such as obstacle detection, under such conditions, the detection accuracy of an object or person in the dark region will decrease.

Then, with regard to a dark region inside an image, i.e., an MB whose average luminance value thereinside is smaller than a preset threshold, $D_{MB}=D_{in}=12$ is set in order to maintain the number of gradations of an input image. On the contrary, with regard to an MB whose average luminance value thereinside is greater than the threshold, $D_{MB}=8$ is set.

As described above, the bit precision information generation unit 225 is provided inside the image transmission device 201, so that the bit precision information taking into consideration the effect on recognition processing can be generated in accordance with the characteristic of each region inside the screen of an image to be encoded.

Note that, here an example of setting the bit precision information based on an average luminance has been described, but the bit precision information may be set using other indicators obtained by analyzing an image to be encoded, such as the edge intensity, variance, or the like for each MB, or by using a combination thereof.

Moreover, in the above, a case has been described, where there are two types of bit precision information, i.e., 12 bits and 8 bits, as an example, but three or more types of bit precision information may be set with a similar method by setting a plurality of thresholds.

Note that the embodiment is also applicable to a monitoring camera system. When the embodiment is applied to a monitoring camera system, a control may be performed for, for example, distinguishing a dark portion inside an image from the other portion in a manner similar to the above and for assigning a higher bit-precision only to the dark portion, but not limited thereto. For example, a higher bit-precision may be assigned to a region, such as a passage, where a person or the like may move, inside the screen, while a lower bit-precision may be assigned to regions, such as the upper portion of a wall, and thus the embodiment of the present invention may be variously modified.

The above description has been made with regard to the embodiments, but the present invention is not limited thereto, and it should be apparent to those skilled in the art that various kinds of changes and modifications can be made within the spirit of the present invention and the scope of the attached claims.

REFERENCE SIGNS LIST

101: image transmission device
102: image capturing unit
103: conversion unit
104: local decoding unit
105: quantization unit
106: quantization control unit
107: encoding unit
108: QP setting unit
109: network IF
110: prediction unit
111: frequency transform unit
121: image reception device
122: network IF
123: decoding unit
124: image processing unit
125: bit precision information generation unit
126: monitor
127: speaker
140: network
151: image transmission device
152: image transmission device
153: image transmission device
201: image transmission device
209: network IF
221: image reception device
222: network IF
225: bit precision information generation unit

The invention claimed is:

1. An on-board camera system, the system comprising:
an image transmission device that encodes an input image and outputs a bit stream; and
an image reception device that receives the bit stream and decodes the bit stream into a decoded image,
wherein the image reception device includes an image processing unit configured to perform image processing using the decoded image,
wherein the image reception device includes a bit precision information generation unit configured to generate bit precision information for each of a plurality of regions in the decoded image,
wherein the image transmission device includes a quantization control unit configured to control a quantization step width in a quantization process performed by the image transmission device in accordance with the bit precision information,
wherein the bit precision information generation unit switches among a plurality of methods for generating the bit precision information in accordance with a driving assistance system mode of the image processing unit,
wherein the bit precision information generation unit generates the bit precision information using at least one of the processing mode and an image recognition processing result of the image processing unit,
wherein the driving assistance system mode has a plurality of modes including an overview monitor mode and a lane detection mode, and
wherein the bit precision information generation unit switches the methods of generating the bit precision information depending on which of the overview monitor mode and the lane detection mode currently is the driving assistance system mode of the image processing unit.

2. The on-board camera system according to claim 1, wherein, when the driving assistance system mode is the lane detection mode, the bit precision information generation unit generates the bit precision information so that a region occupied by a road portion of the input image has a bit precision higher than other regions of the input image.

3. The on-board camera system according to claim 2, wherein the bit precision information is set in advance for each of the modes of the driving assistance system mode, and is recorded in a storage unit.

4. The on-board camera system according to claim 1, wherein the bit precision information is set in advance for the each of the modes of the driving assistance system mode, and is recorded in a storage unit.

5. The on-board camera system according to claim 4, wherein the modes of the driving assistance system mode further include an obstacle detection mode, a road sign detection mode and through mode.

6. An on-board camera system, the system comprising:
an image transmission device that encodes an input image and outputs a bit stream; and
an image reception device that receives the bit stream and decodes the bit stream into a decoded image,
wherein the image reception device includes an image processing unit configured to perform image processing using the decoded image,
wherein the image transmission device includes an image capturing unit configured to capture the input image,
wherein the image transmission device includes a bit precision information generation unit configured to generate bit precision information for each of a plurality of regions in the decoded image,
wherein the image transmission device includes a quantization control unit configured to control a quantization step width in a quantization process performed by the image transmission device in accordance with the bit precision information,
wherein the bit precision information generation unit switches among a plurality of methods for generating the bit precision information in accordance with a driving assistance system mode of the image processing unit,
wherein the image reception device transmits processing mode information of the image processing unit to the image transmission device, wherein the driving assistance system mode has a plurality of modes including an overview monitor mode and a lane detection mode, wherein the bit precision information generation unit generates the bit precision information using at least one of the processing mode information and the input image captured by the image capturing unit, and wherein the bit precision information generation unit switches among a plurality of methods for generating the bit precision information depending on which of the overview monitor mode and the lane detection mode currently is the driving assistance system mode of the image processing unit.

7. The on-board camera system according to claim 6, wherein, when the driving assistance system mode is a lane detection mode, the bit precision information generation unit generates the bit precision information so that a region occupied by a road portion of the input image captured by the image capturing unit has a bit precision higher than other regions of the input image.

8. The on-board camera system according to claim 7, wherein the bit precision information is set in advance for the each of the modes of the driving assistance system mode, and is recorded in a storage unit.

9. The on-board camera system according to claim 6, wherein the bit precision information is set in advance for the each of the modes of the driving assistance system mode, and is recorded in a storage unit.

10. The on-board camera system according to claim 6, wherein the modes of the driving assistance system mode further include an obstacle detection mode, a road sign detection mode and a through mode.

\* \* \* \* \*